Patented Nov. 7, 1944

2,361,966

UNITED STATES PATENT OFFICE 2,361,966

LACTONES OF THE SATURATED AND UNSATURATED CYCLOPENTANOPOLY-HYDROPHENANTHRENE SERIES AND PROCESS OF PREPARING SAME

Leopold Ruzicka, Zurich, Switzerland, assignor to Ciba Pharmaceutical Products Inc., Summit, N. J., a corporation No Drawing. Application April 29, 1942, Serial No. 441,032. In Switzerland May 31, 1941

20 Claims. (Cl. 260—239.5)

The aglycones of most vegetable cardiac poisons are derivatives of the cyclopentanopolyhydrophenanthrene series which are characterized by possessing an unsaturated lactone ring in 17-position.

This invention relates to the manufacture of such lactones of the saturated and unsaturated cyclopentanopolyhydrophenanthrene-series by condensing a compound of the said series having a side chain of the formula

—A—CO—CHY—R in which A stands for an aliphatic hydrocarbon radical, Y is a member of the group consisting of hydrogen and alkyl, and R stands for a free, esterified or etherified hydroxyl group with a functional derivative of a halogen fatty acid, such as an $\alpha$- or $\beta$-halogenated fatty acid ester, amide or nitrile, and if desired subjecting the condensation product to a re-esterifying treatment and/or a treatment for splitting off water.

The parent materials can be easily obtained, for example by starting from bile acids, such as cholanic acid and desoxy-cholanic acid or from their degradation products, or from degradation products of other natural sterols and steroids. Examples of such materials are the 3:7:12-trioxy-norcholanyl-(23)-oxymethyl-ketone I

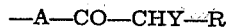

and the $\Delta^5$-3-hydroxy-17-[$17^3$-acetoxy-$17^2$-oxo-propyl]-androstene II [A=—CH$_2$—]

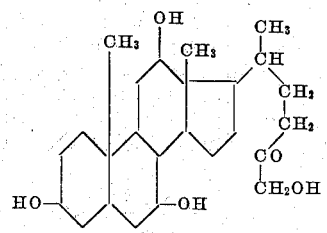

I

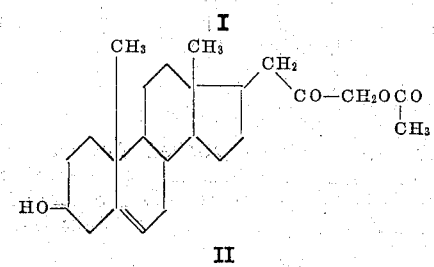

II

The condensation may be effected in known manner by means of metals, such as zinc or magnesium, in a suitable inert solvent, for instance benzene, toluene, dioxane or ether. Lactonization generally occurs during the condensation and also frequently a partial elimination of water. When lactonization takes place only with difficulty a treatment with re-esterifying or hydrolyzing and lactonizing agents may be advantageous. In many instances one obtains mixtures which may be separated into their constituents or further worked up as mixtures. Thus if desired the condensation product may be subjected to the known treatments for eliminating water, of which distillation or sublimation under diminished pressure has proved especially useful, if desired after admixture with surface-active substances, for instance aluminium oxide, silica gel, active carbon, fuller's earth or with an anhydrous salt, for instance copper sulfate. The mixture produced of lactones may be treated for isolating pure components in the usual manner, for instance by fractional crystallization or by chromatographic adsorption analysis.

The products obtained by this process are 5- or 6-membered saturated hydroxylactones or unsaturated lactones which possess between the lactone ring and the cyclopentanopolyhydrophenanthrene nucleus an aliphatic radical, for instance an alkylene group, as described above.

The following examples illustrate the invention but are not to be regarded as limiting it in any way:

*Example 1*

2.0 gr. of 3:7:12-triacetoxy-nor-cholanyl-(23)-acetoxy-methylketone of the formula

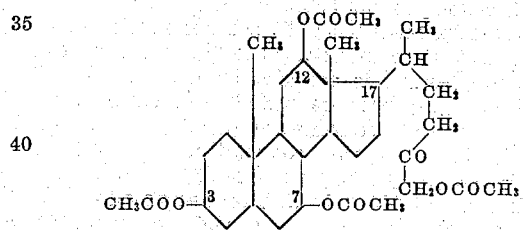

(prepared for example from 3:7:12-triacetoxy-cholanic acid by reaction with thionylchloride, allowing diazomethane to act on the mixture and subsequent treatment with glacial acetic acid) are dissolved in 30 ccm. of absolute benzene, and the solution is caused to react with 2.0 gr. of ethylbromacetate and 1.0 gr. of zinc. After the vigorous reaction has ceased, the mixture is heated in a reflux apparatus for a short time. It is then diluted with absolute alcohol, filtered to remove the unchanged zinc, and decomposed with aqueous hydrochloric acid at moderate heat. The reaction product is taken up in ether and acetylated with acetic anhydride prior to the further working up. The crude mixture of lactones thus obtained is purified chromatographically, whereby the Δ^{α:β}-β-[3:7:12-triacetoxy-nor-cholanyl-(23)]-butenolide of the formula

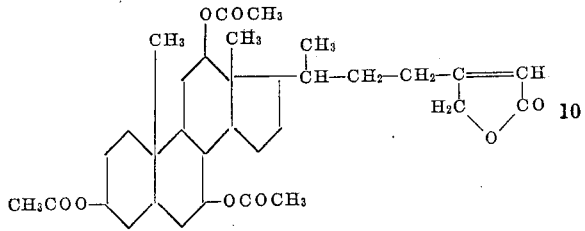

is obtained as main product. The corresponding free 3:7:12-trihydroxy-compound can be obtained by acid saponification.

*Example 2*

Δ^{5:6}-3-acetoxy-25-diazo-26:27 - bisnor - cholestene-24-one (obtained for example according to "Chemisches Zentralblatt," 1939, I, 1182, 1372) are converted by boiling in pure glacial acetic acid into the Δ^{5:6}-3:25-diacetoxy-26:27-bisnor-cholestene-24-one of melting point 126° C. and [α]_D=—45° C. (chloroform).

5.9 gr. of this diacetoxyketone and 9.5 gr. of activated zinc spangles are dried in a high vacuum. 80 ccm. of dry benzene are added and about ⅓ of the solvent is distilled for drying the apparatus. 18 gr. of ethylbromacetate dissolved in 20 ccm. of absolute dioxane are added and the whole is heated in a reflux apparatus until the vigorous reaction sets in. After this has ceased, the solution is diluted with 150 ccm. of absolute alcohol and filtered to remove the zinc which has not been consumed. For completing the the lactonization 40 ccm. of concentrated hydrochloric acid are added to the filtrate and boiling on the water-bath is continued for a short time. After cooling, the whole is diluted with water and the reaction product is taken up in ether. When concentrating the ether solution to a small volume, the larger portion of the reaction mixture is crystallized. By suction filtering there is obtained a product which behaves negatively in the legal test. It consists essentially of β-[Δ^{5:6}-3-hydroxy-nor-cholenyl-(23)]-β:γ-dioxy-n-butyric acid γ-lactone and its 3-monoacetate.

This crude product is boiled for several hours in a reflux apparatus with 150 ccm. of acetic anhydride. It is then evaporated to dryness in a vacuum, the residue is boiled with little methanol and then again evaporated. The reaction product is dissolved in benzene and purified chromatographically. As main product there is obtained β-[Δ^{5:6}-3-acetoxy-nor-cholenyl-(23)]-butenolide which melts at 204–205° C. after recrystallization from alcohol and has a specific rotation of [α]_D=—40.5° (chloroform).

By acid saponification the β-[Δ^{5:6}-3-hydroxy-nor-cholenyl-(23)]-butenolide of melting point 229–230° C., of specific rotation [α]_D=—42.5° (chloroform) and of the formula

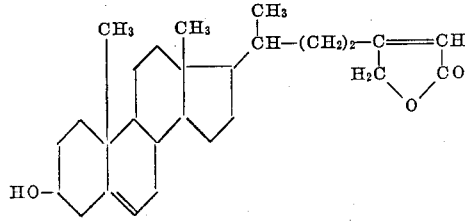

is obtained therefrom in practically quantitative yield. The product yields a positive legal test and has an absorptive maximum at about 220 mμ (log.=4.1).

When using a bromopropionic acid ester instead of a bromoacetic ester, the corresponding butenolide methylated in α-position is obtained. Also higher halogen fatty acid derivatives produce the corresponding α-alkylated butenolides.

When starting from Δ^{5:6}-3:25-diacetoxy-27-nor-cholestene-24-one (obtained by reaction of Δ^{5:6}-3-acetoxy-cholenic acid chloride with diazoethane and subsequent boiling with glacial acetic acid) analogous products which carry a methyl group in γ-position are obtained.

*Example 3*

2.0 gr. of Δ^{5:6}-3-hydroxy-17-[17^3-acetoxy-17^2-oxo-propyl]-androstene of melting point 138–139° C. of the formula

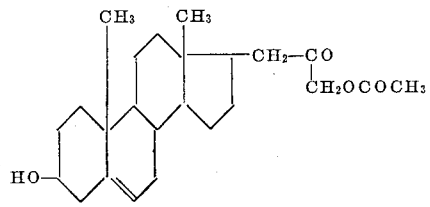

(obtained for example from Δ^{5:17}-3-hydroxy-pregnadiene-21-acid of melting point 249–250° C. by acetylation and reaction with thionylchloride, allowing diazomethane to act on the mixture and subsequent alkaline saponification of the diazoketone obtained by splitting off the acetyl group in 3-position, heating with glacial acetic acid and selective hydrogenation of the monoacetate formed by saturating the 17:20-double bond with Raney-nickel in rectified alcohol) are dissolved in 30 ccm. of absolute benzene and the solution is caused to react with 2.0 gr. of ethylbromacetate dissolved in 10 ccm. of dioxane and 4.0 gr. of zinc-copper. A spontaneous reaction soon sets in, and when this has ceased the reaction mixture is heated for a short time in a reflux apparatus. The reaction mixture is then diluted with methanol. The whole is filtered to remove the unchanged zinc, concentrated to a large degree and decomposed with aqueous hydrochloric acid. The solution obtained is boiled for a short time and, after cooling, the reaction product is taken up in ether. After concentrating the ethereal solution the residue is boiled for some hours with acetic anhydride. The anhydride in excess is evaporated in a vacuum, whereby the crude Δ^{α:β}-β-[Δ^{5:6}-3-acetoxy-21-nor-pregnenyl-(20)]-butenolide of the formula

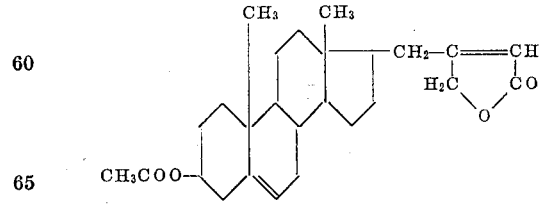

is obtained. This is purified chromatographically and converted into the Δ^{α:β}-β-[Δ^{5:6}-3-hydroxy - 21-nor-pregnenyl-(20)]-butenolide by saponification, for example in dioxane-hydrochloric acid.

Instead of from a Δ^{5:6}-3-hydroxy-17-[17^3-acyloxy-17^2-oxopropyl]-androstene one may start from Δ^{5:6}-3-hydroxy-17-[17^3-hydroxy-17^2-oxopropyl]-androstene or from a Δ^{5:6}-3-hydroxy-17-

[17³-alkoxy-17²-oxo-propyl]-androstene, whereby the same final product is obtained. Instead of ethylbromoacetate there may also be used other halogen-acetic acid esters as well as further functional derivatives of α- or β-halogen fatty acids, such as bromo-acetamide or bromo-acetonitrile.

What I claim is:

1. In a process for the manufacture of a lactone of the cyclopentanopolyhydrophenanthrene series, the step of reacting a compound of the said series having in 17-position the radical

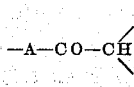

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids, in presence of a metal condensing agent.

2. In a process for the manufacture of a lactone of the 10:13-dimethyl-cyclopentanopolyhydrophenanthrene series, the step of reacting a compound of the said series having in 17-position the radical

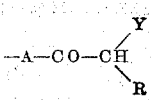

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids, in presence of a metal condensing agent.

3. In a process for the manufacture of a lactone of the 10:13-dimethyl-cyclopentanopolyhydrophenanthrene series, the step of reacting a compound of the said series having in 17-position the radical

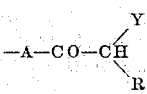

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters of the α- and β-halogen fatty acids, in presence of a metal condensing agent.

4. In a process for the manufacture of a lactone of the 10:13-dimethyl-cyclopentanopolyhydrophenanthrene series, the step of reacting a compound of the said series having in 17-position the radical

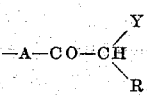

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with ethylbromoacetate, in presence of a metal condensing agent.

5. In a process for the manufacture of a lactone of the unsaturated cyclopentanopolyhydrophenanthrene series, the step of reacting a $\Delta^5$-3:25 - diacyloxy-26:27-bisnorcholestene - 24 - one with ethylbromoacetate in presence of a metal condensing agent.

6. In a process for the manufacture of a lactone of the unsaturated cyclopentanopolyhydrophenanthrene series, the step of reacting $\Delta^5$-3:25-diacetoxy - 26:27 - bisnorcholestene-24-one with ethylbromoacetate in presence of a metal condensing agent.

7. In a process for the manufacture of a lactone of the cyclopentanopolyhydrophenanthrene series, the steps of reacting a compound of the said series having in 17-position the radical

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids, in presence of a metal condensing agent, and then subjecting the resultant condensation product to a process for eliminating water.

8. A process for the manufacture of a lactone of the cyclopentanopolyhydrophenanthrene series, which comprises reacting a compound of the said series having in 17-position the radical

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to a process for eliminating water, and then to the action of a lactonizing agent.

9. A process for the manufacture of a lactone of the cyclopentanopolyhydrophenanthrene series, which comprises reacting a compound of the said series having in 17-position the radical

wherein A stands for an aliphatic hydrocarbon radical containing at least one and no more than 4 carbon atoms, Y is a member of the group consisting of hydrogen and akyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to a process for eliminating water, and then to the action of a hydrolyzing agent, lactonizing agent and re-esterifying agent.

10. A process for the manufacture of a lactone of the cyclopentanopolyhydrophenanthrene series, which comprises reacting a compound of the said series having in 17-position the radical

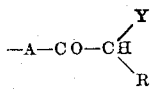

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to the action of a lactonizing agent.

11. A process for the manufacture of a lactone of the cyclopentanopolyhydrophenanthrene series, which comprises reacting a compound of the said series having in 17-position the radical

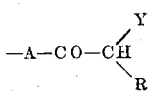

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to the action of a hydrolyzing agent and a lactonizing agent.

12. A process for the manufacture of a lactone of the cyclopentanopolyhydrophenanthrene series, which comprises reacting a compound of the said series having in 17-position the radical

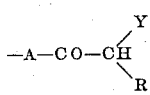

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to the action of a hydrolyzing agent, lactonizing agent and re-esterifying agent.

13. A process for the manufacture of a lactone of the cyclopentanopolyhydrophenanthrene series, which comprises reacting a compound of the said series having in 17-position the radical

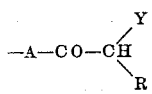

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to the action of a lactonizing agent and then to a process for eliminating water.

14. A process for the manufacture of a lactone of the cyclopentanopolyhydrophenanthrene series, which comprises reacting a compound of the said series having in 17-position the radical

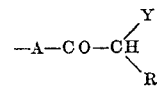

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to the action of a hydrolyzing agent and a lactonizing agent and then to a process for eliminating water.

15. A process for the manufacture of a lactone of the cyclopentanopolyhydrophenanthrene series, which comprises reacting a compound of the said series having in 17-position the radical

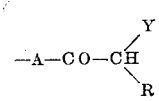

wherein A stands for an aliphatic hydrocarbon radical containing at least one and no more than 4 carbon atoms, Y is a member of the group consisting of hydrogen and alkyl, and R stands for a member of the group consisting of free, esterified and etherified hydroxyl, with a member of the group consisting of the esters, amides and nitriles of the α- and β-halogen fatty acids in presence of a metal condensing agent, and subjecting the condensation product to the action of a hydrolyzing agent, lactonizing agent and re-esterifying agent and then to a process for eliminating water.

16. The saturated and unsaturated cyclopentanopolyhydrophenanthrene compounds having in 17-position one of the groupings

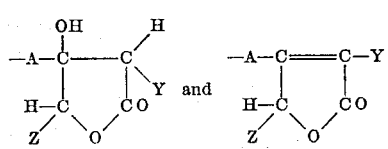

in which A stands for an aliphatic hydrocarbon radical containing at least one and no more than 4 carbon atoms, and Y and Z are members of the group consisting of hydrogen and alkyl.

17. The saturated and unsaturated 10:13-di-methyl-cyclopentanopolyhydrophenanthrene compound, having in 17-position one of the groupings

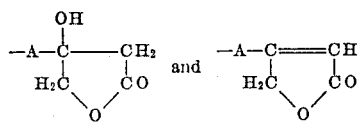

in which A stands for an aliphatic hydrocarbon radical containing at least one and no more than 4 carbon atoms.

18. The Δ^{α:β}-β-[3:7:12-trihydroxy-nor-cholanyl-(23)]-butenolide of the formula
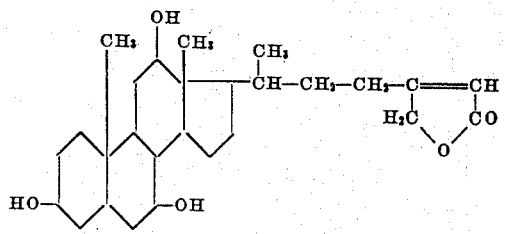
19. The Δ^{α:β}-β-[Δ^{5:6}-3-hydroxy-nor-cholenyl-(23)]-butenolide of the formula
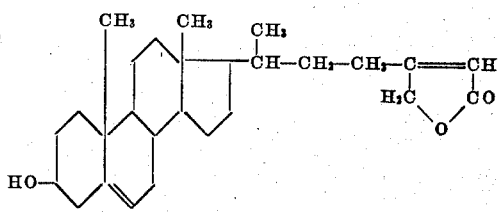
20. The Δ^{α:β}-β-[Δ^{5:6}-3-hydroxy-21-nor-pregnenyl-(20)]-butenolide of the formula
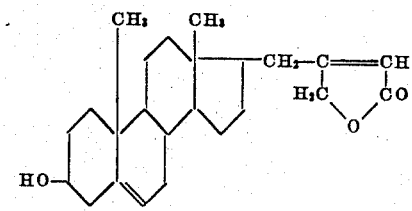
LEOPOLD RUZICKA.